G. A. B. SPENCER.
PRESSURE GAGE.
APPLICATION FILED OCT. 3, 1910.
1,055,827.
Patented Mar. 11, 1913.
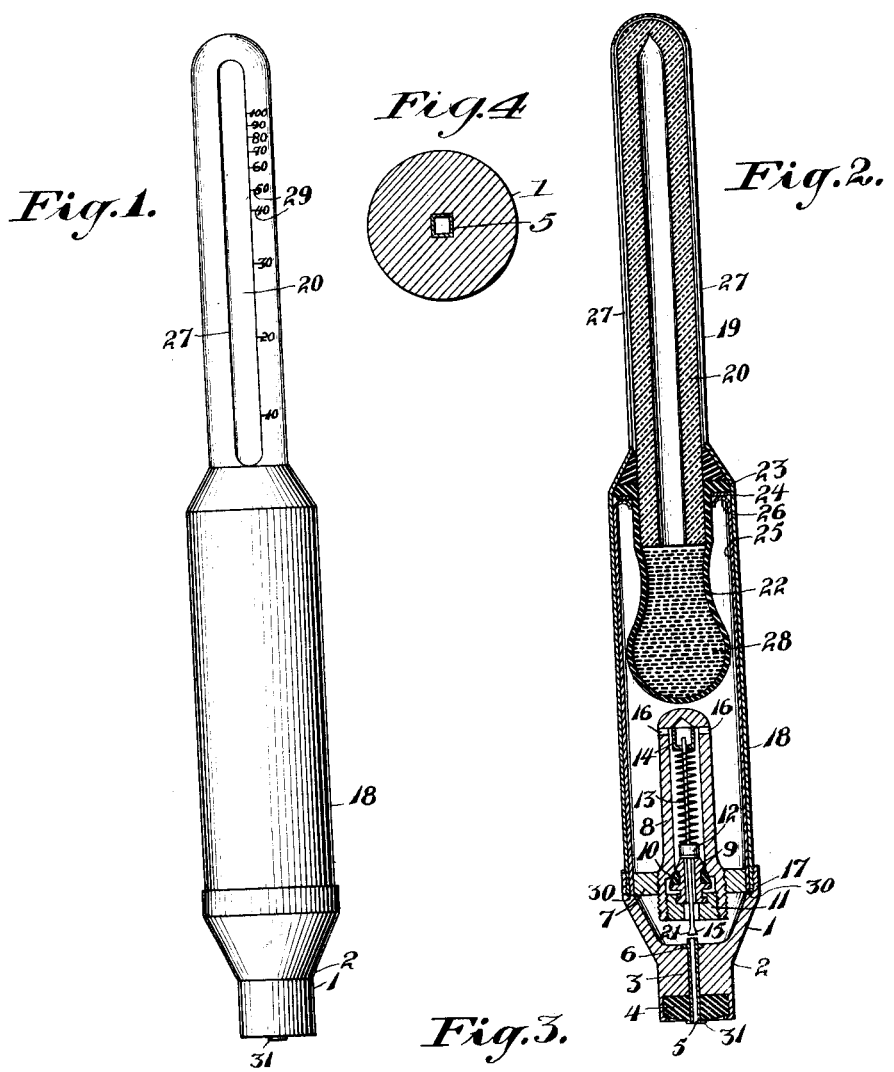

UNITED STATES PATENT OFFICE.

GARDNER A. B. SPENCER, OF SAN FRANCISCO, CALIFORNIA.

PRESSURE-GAGE.

1,055,827. Specification of Letters Patent. Patented Mar. 11, 1913.

Application filed October 3, 1910. Serial No. 585,115.

*To all whom it may concern:*

Be it known that I, GARDNER A. B. SPENCER, a citizen of the United States, residing at San Francisco, in the county of San Francisco and State of California, have invented new and useful Improvements in Pressure-Gages, of which the following is a specification.

The object of this invention is to provide a pressure gage which shall be especially adapted for ascertaining the pressure of the compressed air in the automobile tires.

In the accompanying drawing, Figure 1 is a side view of my device; Fig. 2 is a central longitudinal section of the same transverse to the view shown in Fig. 1; Fig. 3 is an enlarged detail view of the lower end of a valve rod, and of a tube adapted to contact therewith; Fig. 4 is a cross section on the line 4—4 of Fig. 3.

Referring to the drawing, 1 indicates a base, across the lower portion 2 of which extends a web 3, to form a support for a thick rubber gasket 4. Said web and gasket are apertured to form a bearing for a tube 5, and the tube 5 fits tightly in its bearing in the gasket 4, so that they can move only together. Said tube, above the web 3, carries a small washer 6, and upon its lower end is secured a washer 31. Said rubber gasket acts as a spring to normally depress the tube 5. Screwed within a disk 7, held in place by means hereinafter described is a valve casing 8 for a valve seat 9, said seat having a rubber packing ring 10 and being secured in place by means of a head 11 screwed within said casing. Upon said seat normally rests a valve 12 having a valve stem 13 passing through an upper bearing 14 supported in the top of the casing, the lower portion 15 of said stem passing loosely through said seat and its lower end being extended outward into close proximity with the tube 5. Said lower end is flattened, as shown at 21, so that it can neither enter nor close said tube. The upper end of said casing is apertured, as shown at 16, to permit air to pass out therethrough. The stem of the tire valve does not fit so tightly against the lower end of the tube 5 as to prevent the passage of air from the tire into said tube. The upper portion of said base is enlarged and internally threaded as shown at 17, and into said threaded portion is screwed the lower end of a gage casing 18, which is cylindrical in the lower portion and has also a cylindrical reduced upper portion 19. In said upper portion is contained a glass tube 20, closed at the top and open at the bottom, and surrounding the lower end of said tube is the upper end or mouth of a rubber bulb 22, secured in place by means of a flange 23, resting upon a ring 24, which is maintained in place by a cylindrical support 25, the upper edge 26 of which is curled inward, while its lower end rests upon a shoulder 30 of the base. The disk 7 is soldered within the lower end of said support. The rubber bulb 22 is supplied with a sufficiency of mercury 28, and the reduced upper portion of the casing is slotted on each side, as shown at 27, to permit the mercury, when raised in the tube, to be visible through said slot, the edge of the slots being marked with graduated scales 29, (only one being shown).

The mode of use of the device is as follows:—The device is applied to the filling nozzle of a pneumatic tire, the pressure of which pushes inward the tube 5, thereby also pushing inward the valve stem 13 and opening the valve 12. At the same time the outer end of the tube 5 forces down the valve pin within the nozzle of the tire, and the air from the tire passes upward through the tube 5, through the middle of the valve seat, out under the valve 12 in the valve casing, through the apertures 16 in the upper portion thereof, to the chamber around the rubber bulb. The pressure of the air against said rubber bulb compresses said bulb and consequently raises the mercury therein.

As shown in Fig. 4, a cross section of the internal surface of the tube 5 is a square of which the side is less, but the diagonal greater, than the diameter of the valve pin of the nozzle of the tire, so that said valve pin does not enter or fill said tube when pressed thereagainst and hence does not prevent air passing through the tube. When the device is withdrawn from the nozzle of the tire, the resiliency of the rubber gasket 4 withdraws the tube 5 from the lower end of the tube 15. The pressure of said air determines the level of mercury in the tube 20 which is indicated by the graduated scale 29 at the edge of either slot 27.

An important feature of this invention is that, immediately after the device is removed from the filling nozzle, the valve 12 is pressed on to its seat by the coiled spring and the compressed air within the casing 18, and no air escapes from the casing through said valve, consequently the mercury remains at the same level, so that the pressure of the pneumatic tire can be read after the device is removed from the tire. In this respect it is a great improvement upon prior devices of this character, in which it was necessary to retain the gage upon the tire in order to ascertain the pressure of the compressed air within the tire. Such an operation is generally inconvenient, and particularly so when the part of the tire to which the gage is applied is close to the ground.

By pressing upon the washer 31, the valve 12 can be opened and the compressed air released from the interior of the casing 18, and the gage restored to its normal condition.

I claim:—

1. The combination of a casing, a valve for admitting air to said casing, a valve seat for said valve, a stem for said valve extending loosely through said seat and from the opposite side of the valve, whereby the valve is adapted to be opened by pressure upon the end of said stem projecting through said seat, a coiled spring around the other end of said stem for holding the valve to its seat, a transverse rubber gasket in said casing and a tube passing through said gasket and adapted to impinge upon said stem, the adjacent end of the stem being formed so that it can neither enter nor close said tube, substantially as described.

2. The combination of a casing, a valve for admitting air to said casing, a valve seat for said valve, a stem for said valve extending loosely through said seat from one side of the valve, the other end of the stem extending from the opposite side of said valve, an abutment member supporting the said last named end of the stem, a coil spring around said end between the abutment and valve for holding the latter in its seat, a transverse rubber gasket in said casing and a tube passing through said gasket to impinge upon the end of said stem projecting through said seat, said end being formed so that it can neither enter nor close said tube.

In testimony whereof I have hereunto set my hand in the presence of two subscribing witnesses.

GARDNER A. B. SPENCER.

Witnesses:
FRANCIS M. WRIGHT,
D. B. RICHARDS.